United States Patent
Linzer et al.

(10) Patent No.: US 7,408,988 B2
(45) Date of Patent: Aug. 5, 2008

(54) MOTION ESTIMATION ENGINE WITH PARALLEL INTERPOLATION AND SEARCH HARDWARE

(75) Inventors: Elliot N. Linzer, Suffern, NY (US); Ho-Ming Leung, Cupertino, CA (US); Soo-Chul Han, Pleasanton, CA (US)

(73) Assignee: LSI Corporation, Milpitas, CA (US)

( * ) Notice: Subject to any disclaimer, the term of this patent is extended or adjusted under 35 U.S.C. 154(b) by 886 days.

(21) Appl. No.: 10/325,188

(22) Filed: Dec. 20, 2002

(65) Prior Publication Data
US 2004/0120401 A1  Jun. 24, 2004

(51) Int. Cl.
*H04N 7/18* (2006.01)
(52) U.S. Cl. .............. 375/240.16; 375/240.17
(58) Field of Classification Search ......... 375/240.01–240.29; 382/107, 232, 240; *H04N 7/12*
See application file for complete search history.

(56) References Cited

U.S. PATENT DOCUMENTS

| | | | | |
|---|---|---|---|---|
| 5,355,168 A * | 10/1994 | Sugiyama | ............. | 375/240.16 |
| 5,488,419 A * | 1/1996 | Hui et al. | ............... | 375/240.17 |
| 6,061,397 A * | 5/2000 | Ogura | ................... | 375/240.16 |
| 6,556,716 B2 * | 4/2003 | Hong | ........................ | 382/232 |
| 6,560,371 B1 * | 5/2003 | Song et al. | .................. | 382/240 |
| 6,704,358 B1 * | 3/2004 | Li et al. | ................. | 375/240.02 |
| 6,950,469 B2 * | 9/2005 | Karczewicz et al. | ... | 375/240.17 |
| 2001/0046264 A1 * | 11/2001 | Fandrianto et al. | ..... | 375/240.16 |
| 2002/0181745 A1 * | 12/2002 | Hu | ............................. | 382/107 |
| 2004/0062309 A1 * | 4/2004 | Romanowski et al. | . | 375/240.16 |

* cited by examiner

*Primary Examiner*—Andy S Rao
(74) *Attorney, Agent, or Firm*—Christopher P. Maioran PC

(57) ABSTRACT

A method for motion estimating. The method generally includes the steps of (A) generating a first interpolated block having a sub-pixel resolution in response to a first interpolation process operating on a reference block of a reference frame of a video signal having an integer pixel resolution, (B) generating a motion vector in response to the first interpolated block and a current block of a current frame of the video signal having the integer pixel resolution and (C) generating a second interpolated block having the sub-pixel resolution in response to a second interpolation process operating on the reference block.

22 Claims, 7 Drawing Sheets

MOTION ESTIMATION ENGINE WITH PARALLEL INTERPOLATION AND SEARCH HARDWARE

CROSS REFERENCE TO RELATED APPLICATIONS

The present application may relate to co-pending application Ser. No. 10/324,487 filed Dec. 20, 2002, which is hereby incorporated by reference in its entirety.

FIELD OF THE INVENTION

The present invention relates to motion estimation generally and, more particularly, to a motion estimation engine with parallel interpolation and search hardware.

BACKGROUND OF THE INVENTION

Compression of digital video data is performed for many applications, including but not limited to transmission over bandwidth constrained channels, such as satellite broadcasts, and storage on optical media. In order to achieve very efficient compression, complex, computationally intensive processes are used for encoding (compressing) and decoding (decompressing) video. For example, even though MPEG-2 (Motion Picture Expert Group) is known as a very efficient method for compressing video, a new, more efficient standard (i.e., H.264) is being developed.

Part of the encoding process involves so-called motion compensation. Based on a determined motion vector, an encoder fetches a block of data from an already transmitted reference frame, computes the difference between a to-be-encoded block and the block from the reference frame and compresses and transmits a difference. A decoder uses the same motion vector, fetches the same reference block, decompresses the difference information and adds the decompressed difference to the reference block.

Like other compression standards, the H.264 standard employs sub-pixel motion vectors. Both components (i.e., horizontal and vertical) of a motion vector are given in quarter-pixel units. When either component does not lie on the integer-pixel grid, the encoder interpolates the reference frame to find the values in-between the actual integer pixels, computes the difference between a to-be-encoded block and the interpolated block from the reference frame, and compresses and transmits the difference. The decoder performs the same interpolation before adding the reference block and the decompressed difference.

Referring to FIG. 1, an illustration of a conventional 8×8 block 20 within a frame of a video signal is shown. Pixels at integer positions within the block 20 (i.e., integer pixels) are represented by the letter I. Each pixel that lies on an integer position vertically but half way between two integer locations horizontally (i.e., H), is computed as a weighted sum of three integer pixels I in integer positions to the left and three integer pixels I in integer positions to the right. The pixels H are referred to as (1,½) pixels. Each pixel that lies on an integer position horizontally but half way between two integer locations vertically (i.e., V), is computed as a weighted sum of three integer pixels I in integer positions above and three integer pixels I in integer positions below. The pixels V are referred to as (½,1) pixels. Each pixel that lies half-way between integer pixels vertically and half-way between pixels horizontally (i.e., T) is computed as either (i) a weighted sum of three (1,½) pixels above and three (1,½) pixels below or (ii) a weighted sum of three (½,1) pixels to the left and three (½,1) pixels to the right. Computation of the pixels V, H and T transforms the block 20 into a 16×16 pixel grid having a half-pixel resolution.

Pixels on a quarter-pixel resolution grid (i.e., Q) having vertical and/or horizontal components that are not integer multiples of ½, are computed from the pixels I, H, V and T of the half-pixel resolution grid. A process for generating the pixels Q is fairly simple, involving a bi-linear interpolation process. In the bi-linear interpolation process, only the half-pixel grid neighbors are used to calculate the pixels Q. An exact approach for pixel Q generation depends on a position of the interpolated pixels Q relative to the integer pixels I. Details for quarter-pixel resolution interpolation can be found in the H.264 specification. A technique that the H.264 specification employs is to use long (i.e., 6-tap) filters for sub-pixel motion compensation. The sub-pixel interpolation process in accordance with H.264 can be very computationally intensive.

A conventional encoder commonly employs one of the following two techniques for sub-pixel interpolation. In a first technique, each reference frame of the video signal is interpolated to quarter-pixel resolution and stored in a memory. For motion compensation or motion estimation, the needed pixels I, H, V, T and Q are fetched from the memory. Therefore, motion compensation or motion estimation processes is computationally efficient because each sub-pixel position is computed only once. The first technique is conceptually simple and used in conventional software decoders. However, the first technique is not appropriate for a low-cost hardware decoder. The drawbacks of the first technique include (i) using a large amount of memory since each reference frame uses 16 times as much memory as is otherwise needed and (ii) a memory bandwidth used for motion estimation or motion compensation is greatly increased.

In the second technique, the integer pixels I are fetched from the memory and the interpolated pixels H, V, T and Q are computed when a block is needed for motion compensation. For motion estimation, the needed pixels are fetched and interpolation is performed "on-the-fly". That is, for each motion vector considered (i) the interpolated pixels are computed and then (ii) an error score, such as sum of absolute differences, is computed between the interpolated block and the to-be-encoded block. For all motion vectors considered, the motion vector with a smallest "error" is selected. The second technique works well for a simple sub-pixel interpolation scheme. For example, MPEG-1 and MPEG-2 employ simple bi-linear sub-pixel interpolation, and only half-pixel, not quarter-pixel interpolation is used. Some conventional media processors employ the simple, serial, process of the second technique for computing error scores for sub-pixel motion vectors from the integer pixels I. In a single clock cycle, special purpose hardware is used to compute 64 sub-pixel positions and an error score between those interpolated values and another block of 64 pixels. For long sub-pixel filters, such as those used in H.264, the second technique is very inefficient. Computing 64 sub-pixel positions is much more complicated and time consuming then computing the error between the interpolated pixels and other pixels. Therefore, the second technique can be slow and much of the time the "error" hardware will be idle, waiting for the "interpolation" hardware to complete.

SUMMARY OF THE INVENTION

The present invention concerns a method for motion estimating. The method generally comprises the steps of (A) generating a first interpolated block having a sub-pixel resolution in response to a first interpolation process operating on a reference block of a reference frame of a video signal having an integer pixel resolution, (B) generating a motion vector in response to the first interpolated block and a current block of a current frame of the video signal having the integer pixel resolution and (C) generating a second interpolated block having the sub-pixel resolution in response to a second interpolation process operating on the reference block.

The objects, features and advantages of the present invention include providing a motion estimation engine and/or method that may (i) occupy a small area, (ii) operate at low clock speed, (iii) provide fast encoding, (iv) provide fast decoding, (v) run software processes quickly and/or (vi) provide closed loop encoding.

BRIEF DESCRIPTION OF THE DRAWINGS

These and other objects, features and advantages of the present invention will be apparent from the following detailed description and the appended claims and drawings in which:

Figure 1:
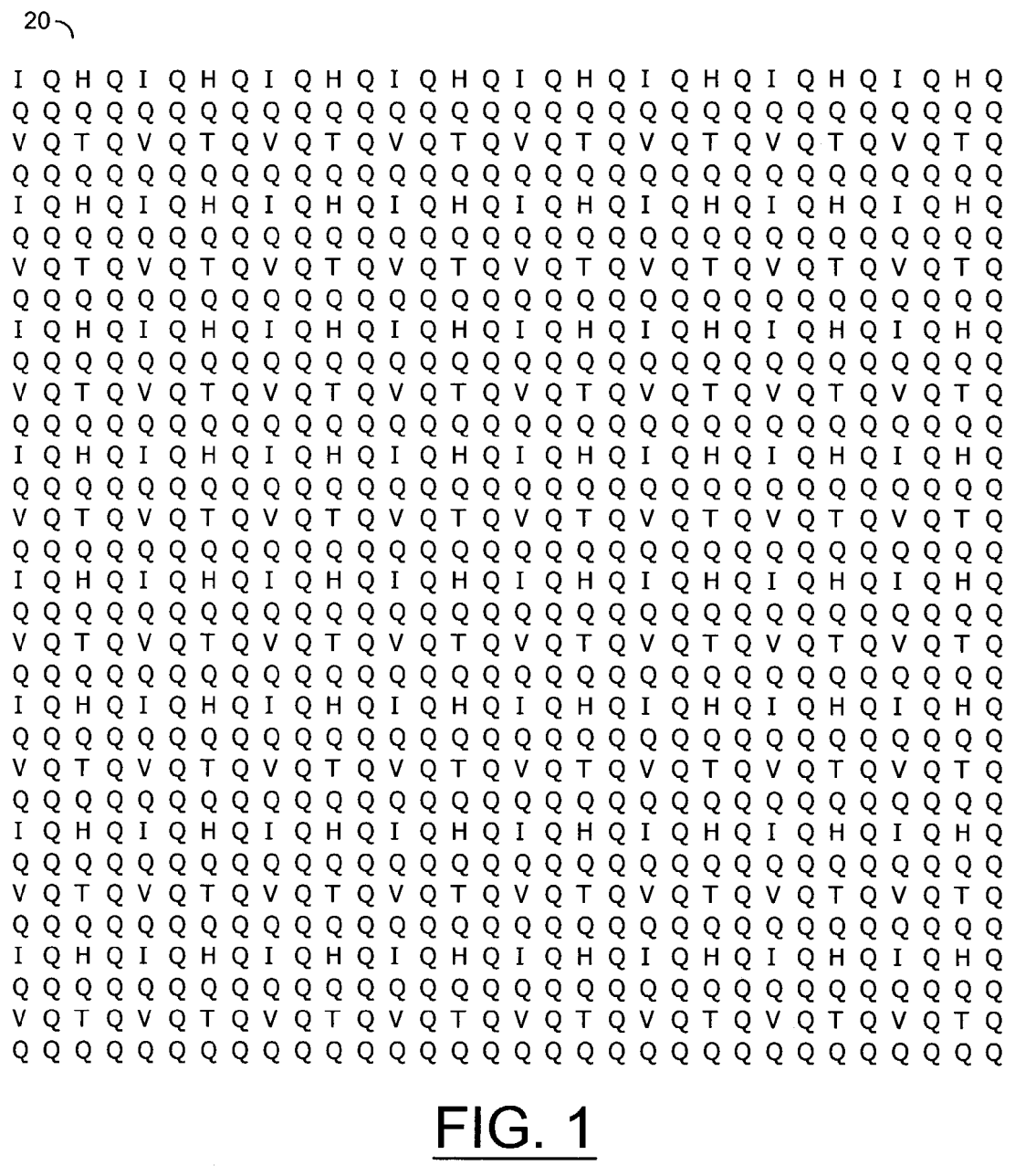

FIG. 1 is an illustration of a conventional 8×8 block within a frame of a video signal;

DETAILED DESCRIPTION OF THE PREFERRED EMBODIMENTS

The present invention concerns multiple methods that may efficiently perform sub-pixel motion estimation. The approaches may be used independently or together. A first approach generally uses a simple interpolation process, such as using only bi-linear interpolation for motion estimation. A more complex, long-filter method may be used for motion compensation. Another approach generally performs an integer pixel search substantially simultaneously with an interpolation pipelines to a sub-pixel search. Variations on the approaches may also be implemented.

Figure 2:
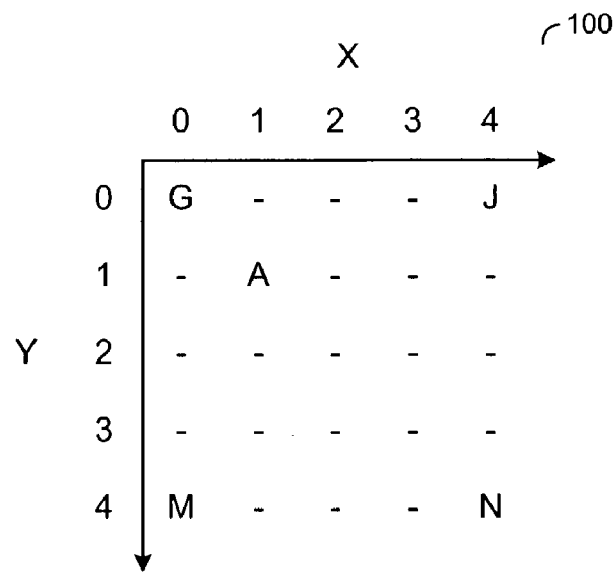
FIG. 2 is an illustration of several example pixels showing an interpolation in accordance with an embodiment of the present invention.

Referring to FIG. 2, an illustration of several example pixels in a frame 100 of a video signal is shown. The pixels may illustrate an interpolation in accordance with an embodiment of the present invention. Image information from four neighboring integer pixels (e.g., G, J, M and N) may be interpolated to generate an interpolated pixel or sample (e.g., A). The interpolated pixel A may be at a horizontal distance (e.g., X), measured in quarter-pixel units, and a vertical distance (e.g., Y) from the integer pixel G. A value for the interpolated pixel A may be calculated according to Equation 1 as follows:

$$A=((G*(4-X)+J*X)*(4-Y)+(M*(4-X)+N*X)*Y)/16 \qquad \text{Eq.(1)}$$

Figure 3:
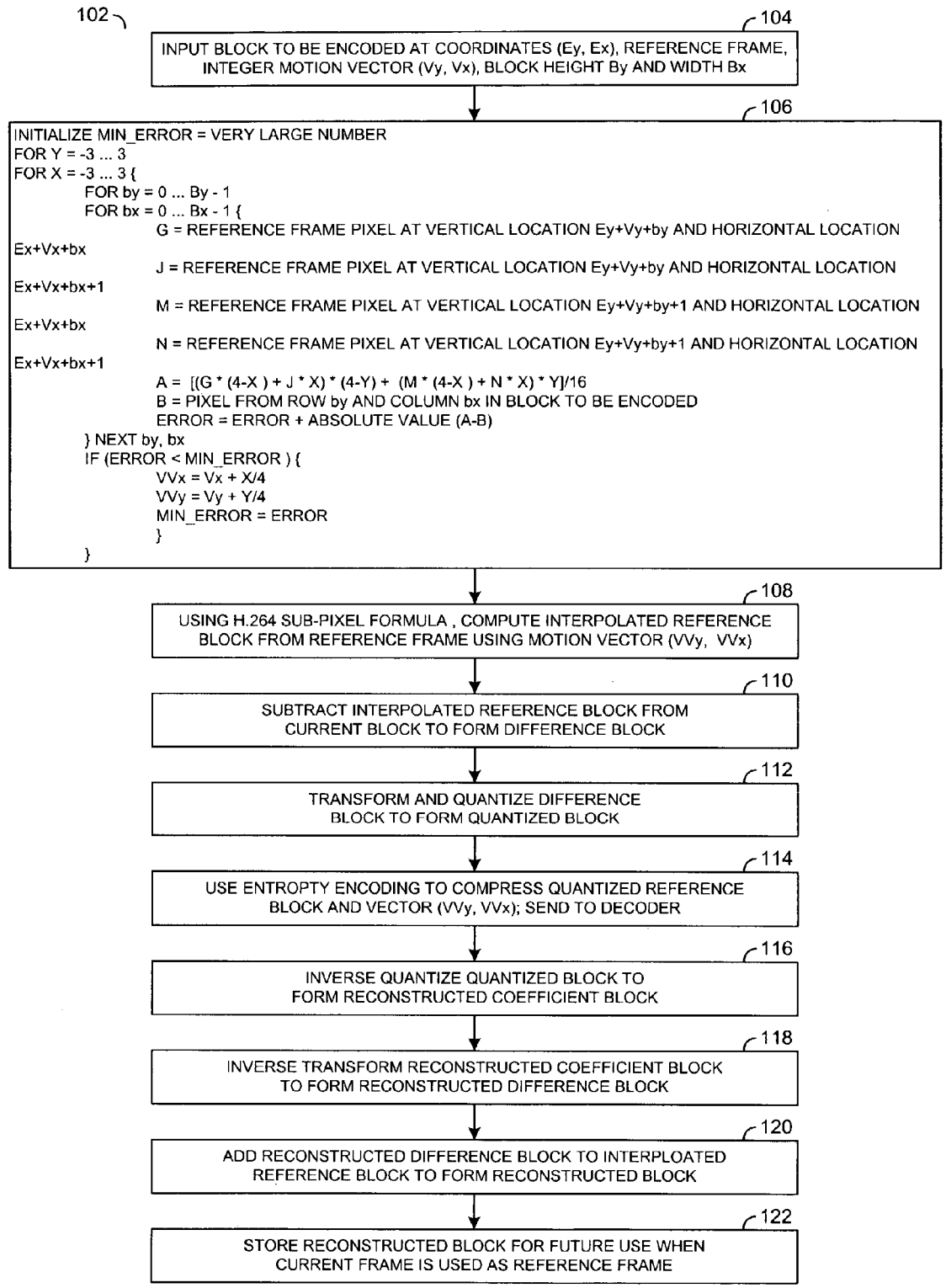
FIG. 3 is a flow diagram of a first method for encoding.

Referring to FIG. 3, a flow diagram of a first method 102 for encoding is shown. The method 102 generally (i) finds motion vectors for a current block in a current frame with respect to a reference frame, (ii) compresses the current block using the motion vectors and (iii) reconstructs the current block for later use as a next reference frame. The reconstruction may be performed when compressing a sequence of frames. An encoder compressing another frame using the reconstructed frame as the reference frame will generally have a copy of the reconstructed frame that matches exactly the same frame constructed in a decoder. The encoder may be thus be referred to as a "closed loop" encoder. Even though the current frame may not transmitted exactly because of a quantization step performed during encoding, errors (e.g., inexact pixel values) induced by encoding the current frame will not propagate to future frames. Instead, any errors in the encoded frames that may be compressed, even errors that use the inexact representation of the current frame, may be due only to quantization in the frame.

The method 102 generally begins by generating a coarse or integer motion vector (e.g., (Vy, Vx)) for an input or current block having a width (e.g., Bx) and a height (e.g., By) to be encoded at coordinates (e.g., (Ey, Ex)) of a current frame. The integer motion vector may be found by searching for the current block in a reference frame (e.g., step 104). A second search may then be conducted with an interpolation process generally being performed during the second search (e.g., step 106). The interpolation process may be implemented as a bi-linear interpolation process. The interpolation process may generate interpolated pixels on a quarter-pixel grid. Other interpolation processes may be implemented to meet a criteria of a particular application.

The second search may determine a fine motion vector (e.g., (VVy, VVx)) having the sub-pixel resolution. A region of the reference frame proximate the fine motion vector (Wy, Vvx) may be interpolated a second time using a different interpolation process (e.g., step 108). The different or second interpolation process may be implemented in accordance with an H.264 standard. See, for example, document JVT-E022d7 entitled "Editor's Proposed Draft Text Modifications for Joint Video Specification (IUT-T Rec. H.264 ISO/IEC 14496-10 AVC), Draft 7" (published 19 Sep. 2002 by the Joint Video Team (JVT) of ISO/IEC MPEG and ITU-T VCEG, Berlin, Germany), which is hereby incorporated by reference it its entirety. The second interpolation process may generate an interpolated reference block that may form a basis for motion compensation.

The interpolated reference block may be subtracted from the current block in the current frame to generate a difference block (e.g., step 110). The difference block may then be transformed and quantized (e.g., step 112) to generate a quantized block. Entropy encoding may be used to compress the quantized block and the fine motion vector (Vvy, VVx) before storage in a medium or transmission to a decoder (e.g., step 114).

The method 102 may also inverse quantize the quantized block to generate a reconstructed coefficient block (e.g., step 116). An inverse transform operation on the reconstructed coefficient block may generate a reconstructed difference block (e.g., step 118). The reconstructed difference block may be added to the interpolated reference block to generate a reconstructed block (e.g., step 120). The reconstructed block may be stored for future processing where the reconstructed block is generally used as a new reference block (e.g., block 122).

Because the first method 102 generally does not use an "exact" method for motion estimation to determine which vector to use, the first method 102 may not always produce an absolute "best" motion vector. Therefore, the difference block as computed by the first method 102 may be somewhat larger than a difference between a theoretical block to which the "best" motion vector would refer and an actual block to be encoded. For example, an embodiment using the method 102 with bi-linear interpolation at an estimation stage (e.g., step 106) may experience a slight bit rate increase (e.g., 1%) to achieve a quality similar to an exact interpolation method. However, because an encoder implementing the method 102 generally uses the exact same method as a decoder for motion compensation (e.g., step 108), there may be no error propagation induced by a less-then-ideal sub-pixel motion vector (VVy, VVx).

Figure 4:
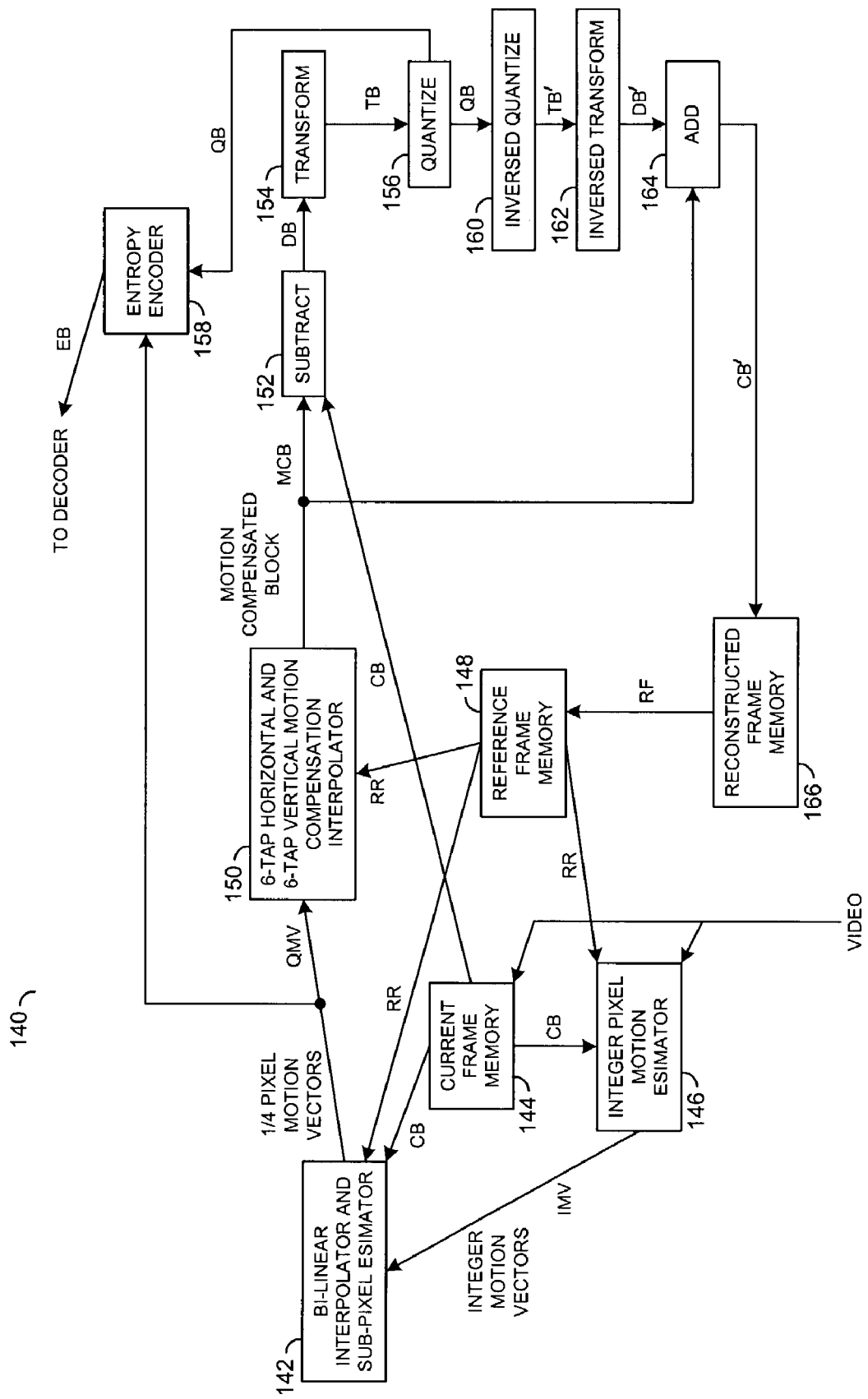
FIG. 4 is a block diagram of an example apparatus in accordance with a preferred embodiment of the present invention.

Referring to FIG. 4, a block diagram of an example apparatus 140 implementing the first method 102 is shown in accordance with a preferred embodiment of the present invention. The apparatus 140 may embody the first method 102. The apparatus 140 generally comprises a interpolator/motion estimator circuit 142, a current frame memory circuit 144, a motion estimator circuit 146, a reference frame memory circuit 148, a motion compensation interpolator circuit 150, a subtract circuit 152, a transform circuit 154, a quantization circuit 156, an encoder circuit 158, a inverse quantization circuit 160, an inverse transform circuit 162, an add circuit 164, and a reconstructed frame memory circuit 166.

The current frame memory circuit 144 may be configured to store a current frame of a video signal (e.g., VIDEO) being encoded. The current block (e.g., CB) from the current frame may be presented to the motion estimator circuit 146, the interpolator/motion estimator circuit 142 and the subtract circuit 152. The reference frame memory circuit 148 may be configured to store a reference frame of the video signal. The reference frame memory circuit 148 may convey a region (e.g., RR) of the reference frame, overlapping and extending slightly beyond the current block CB, to the motion estimator circuit 146, the interpolator/motion estimator circuit 142 and the motion compensation interpolator circuit 150.

The motion estimator circuit 146 may search for an integer-pixel motion vector between the current block CB and a reference block within the reference region RR producing a lowest error score (e.g., a best match to the current block CB). The motion estimator circuit 146 may present an integer-pixel motion vector (e.g., IMV) to the interpolator/motion estimator circuit 142. The interpolator/motion estimator circuit 142 may interpolate the region RR to a sub-pixel (e.g., quarter-pixel) resolution while searching for a better motion vector. The interpolator/motion estimator circuit 142 may present an updated motion vector (e.g., QMV) having the sub-pixel resolution to the motion compensation interpolator circuit 150 and the entropy encoder circuit 158.

The motion compensation interpolator circuit 150 may be configured to interpolate a current block size portion of the region RR about the quarter-pixel motion vector QMV into the sub-pixel resolution using a second interpolation process. In one embodiment, the motion compensation interpolator circuit 150 may operate on the reference frame using a 6-tap horizontal and a 6-tap vertical interpolation. Other interpolation processes may be implemented to meet the criteria of a particular application. The motion compensation interpolator circuit 150 may present the interpolated region as a motion compensated block (e.g., MCB) to the subtract circuit 152 and the add circuit 164.

The subtract circuit 152 may subtract the motion compensated block MCB from the current block CB to generate a difference block (e.g., DB). The transform circuit 154 may transform the difference block DB to generate a transformed block (e.g., TB). The quantization circuit 156 may quantize the transformed block TB to generate the quantized block (e.g., QB). The quantized block QB may be presented to the entropy encoder circuit 158 for encoding based on the quarter-pixel motion vector QMV and then transferred to a decoder and/or a storage medium as an encoded block (e.g., EB).

Closed loop encoding may be provided by the inverse quantization circuit 160, the inverse transform circuit 162, the add circuit 164 and the reconstructed frame memory 166. The quantized block QB may be inverse quantized by the circuit 160 to generate another transformed block (e.g., TB'). The inverse transform block 162 may convert the transformed block TB' into another difference block (e.g., DB'). The add circuit 164 may add the motion compensated block MCB to the difference block DB' to generate a reconstructed current block (e.g., CB'). Ideally, the reconstructed current block CB' may be identical to the original current block CB. However, due to round-off in the quantization process, the reconstructed current block CB' is generally slightly different than the current block CB. The reconstructed current block CB' may be stored in the reconstructed frame memory circuit 166 as part of a reconstructed frame (e.g., RF). As a result, the encoder apparatus 140 may generate the reconstructed current block CB' in a manner identical, or at least very similar, to how the decoder reconstructs the encoded block EB. The reconstructed frame RF may be transferred to the reference frame memory 148 at a later time where the reconstructed frame FB may be used as a new reference frame to encode a new current frame.

Figure 5:
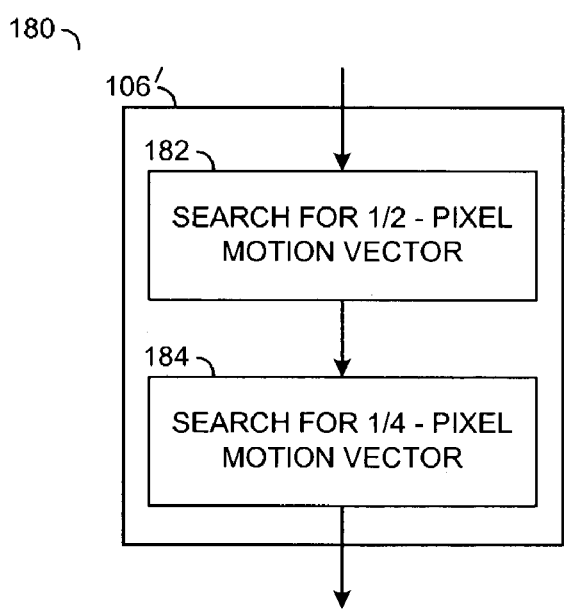
FIG. 5 is a flow diagram of a portion of a second method of encoding.

Referring to FIG. 5, a flow diagram of a portion of a second method 180 of encoding is shown. As a variation on the method 102, the sub-pixel (e.g., quarter-pixel) motion vectors may be generated from intermediate-pixel (e.g., half-pixel) motion vectors in a two-step process. The second method 180 may be similar to the first method 102 with a two-element step 106' substituted for step 106. In a first step (e.g., step 182), coordinates for the half-pixel motion vectors (e.g., (VHy, VHx)) may be derived looking only at neighboring pixels I, H, V and T in an area defined by Y=−2, 0, 2 and X=−2, 0, 2 in quarter-pixel units, centered on the integer motion vector IMV. In a second step (e.g., step 184), coordinates for the quarter-pixel motion vectors (VVy, VVx) may be derived from the half-pixel vectors looking at VHY+(−1, 0, 1) and VHX+(−1, 0, 1) in quarter-pixel units. The steps 182 and 184 may be implemented in the interpolator/motion estimator circuit 142 of the apparatus 140. For the second method 180, only 18 motion vectors may be evaluated (9 in the first step 182 and 9 in the second step 184), whereas for the first method 102, a total of 49 motion vectors may be evaluated (e.g., 7*7 possible positions). Thus the second method 180 is generally faster than the first method 102, while the first method 102 may provide a slightly better compression and have a slightly less complicated form.

Figure 6:
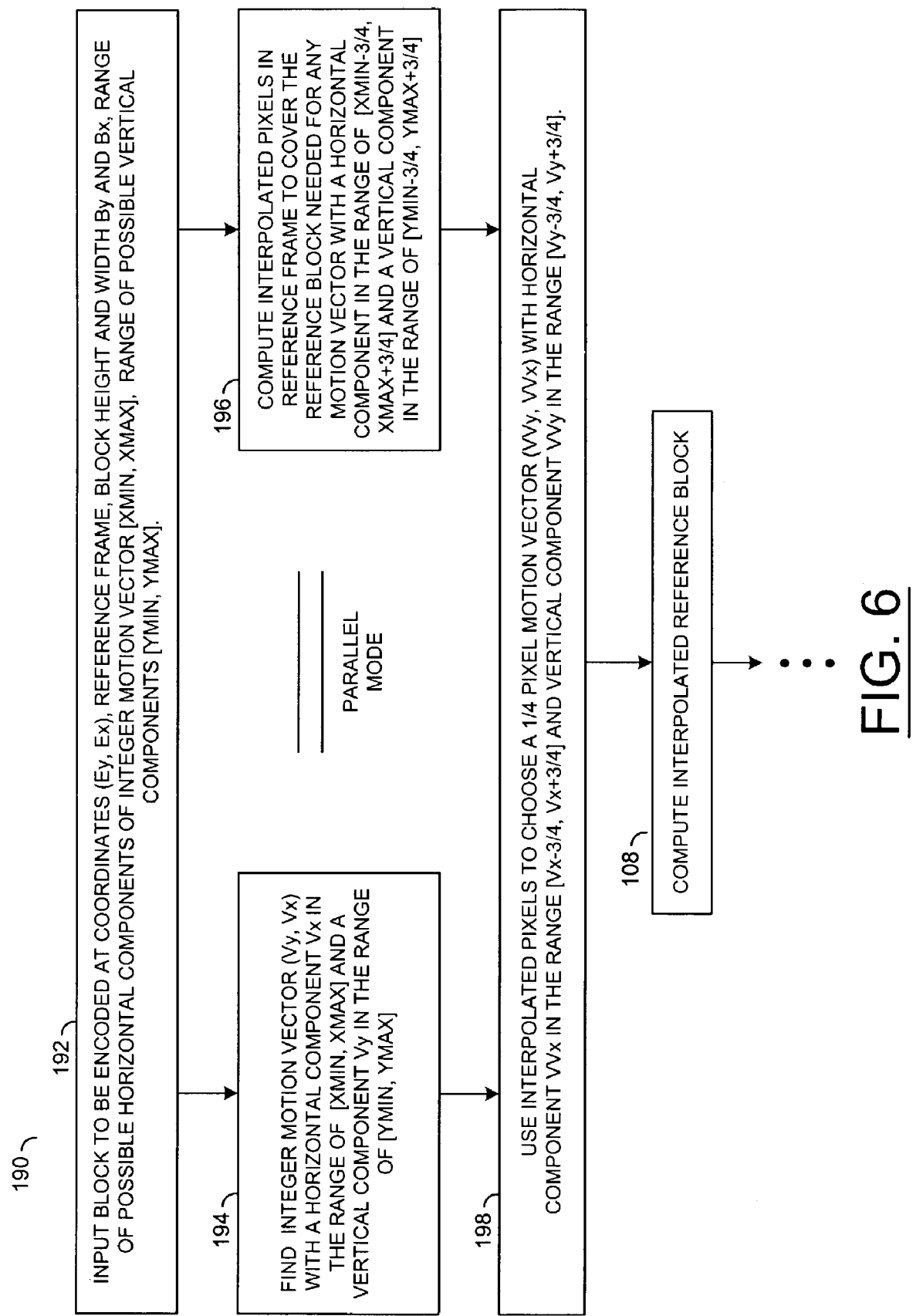
FIG. 6 is a flow diagram of a portion of a third method for encoding.

Referring to FIG. 6, a flow diagram of a portion of a third method 190 for encoding is shown. The third method 190 is generally well suited for a parallel hardware platform. A range from which to search for a selected integer motion vector may be identified, based on the current block at a coordinate (e.g., (Ey, Ex) in the current frame, and then narrowed or made smaller (e.g., step 192). The narrowed search range of the integer motion vectors may a rectangle. A horizontal component of the rectangle may be anywhere in a range (XMIN, XMAX) and the vertical component may be anywhere in a range (YMIN, YMAX). Several techniques may be implemented for narrowing the search range including, but not limited to, a hierarchical search. When a hierarchical search is used, decimated versions of the current frame and the reference frame may be used to find a small range over which an integer-level search may be performed.

An integer-pixel motion vector search may then be performed (e.g., step 194) to determine a motion vector within the narrowed search rectangular range to generate the integer-pixel motion vector (Vy, Vx). While performing the integer level search step 194, all of the interpolated pixels that may be used to determine any sub-pixel motion vector within a region having a horizontal component in a range (XMIN−3/4, XMAX+3/4) and a vertical horizontal component in a range (YMIN−3/4, YMAX+3/4) may be computed (e.g., step 196). The integer-pixel motion vector search step 194 may be performed in parallel or substantially simultaneously with the interpolation calculation step 196. After determining an integer-pixel motion vector and computing the appropriate interpolated pixels, a search may be performed for all sub-pixel motion vectors with a horizontal component in a range (Vx−3/4, Vx+3/4), and a vertical horizontal component in a range (Vy−3/4, Vy+3/4) to adjust the integer-pixel motion vector into a final quarter-pixel motion vectors (e.g, step 198). The third method 190 may continue using the steps 108-122 (only step 108 shown for clarity) from the first method 102 to generate a encoded block EB and generate a reconstructed frame RF.

Figure 7:
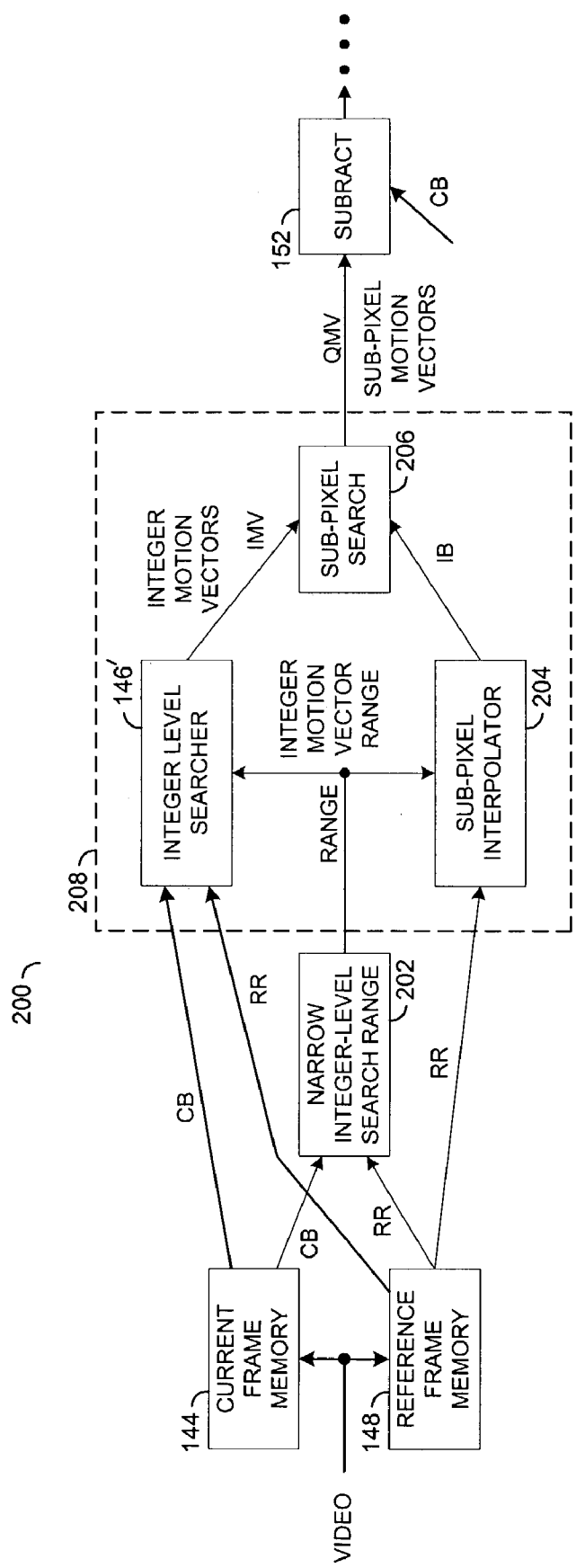
FIG. 7 is a block diagram of an example apparatus implementing the second method.

Referring to FIG. 7, a block diagram of an example apparatus 200 implementing the second method 190 is shown. Similar circuits from the apparatus 140 may be illustrated with like numbers. The apparatus 200 generally comprises the current frame memory circuit 144, the reference frame memory circuit 148, a narrow integer-level search range circuit 202, a integer-pixel motion estimator circuit 146', an interpolator circuit 204 and a sub-pixel motion estimator circuit 206. The integer-pixel motion estimator circuit 146' of the apparatus 200 may be designed and/or operate similar to the integer-pixel motion estimator circuit 146 of the apparatus 140, but may search over a narrow range defined by a signal (e.g., RANGE). In one embodiment, the integer-pixel motion estimator circuit 146', the interpolator circuit 204 and the sub-pixel motion estimator circuit 206 may be logically and/or physically implemented a single circuit 208.

The narrow integer-pixel level search range circuit 202 may receive the current block CB from the current frame and the region RR of the reference frame from the current frame memory circuit 144 and the reference frame memory circuit 148, respectively. The narrow integer-pixel level search range circuit 202 may determine the narrower range in which a search for a best integer-pixel motion vector IMV may be performed. The narrowed range may be presented in the signal RANGE to the integer-pixel motion estimator circuit 146' and to the interpolator circuit 204.

The integer-pixel motion estimator circuit 146' may operate in parallel or substantially simultaneously with the interpolator circuit 204 to generate the integer-pixel motion vector IMV. The interpolator circuit 204 may generate an interpolated block (e.g., IB) from the region RR based on the narrowed range signal RANGE. The sub-pixel search circuit 206 may operate on the integer-pixel motion vector IMV and the interpolated block IB information to adjust or update the integer-pixel motion vector IMV into the sub-pixel motion vector QMV. The remainder of the apparatus 190 may comprise the circuits 152-166 (only circuit 152 shown for clarity) of the apparatus 140 to generate an encoded block EB and a reconstructed frame RF.

Figure 8:
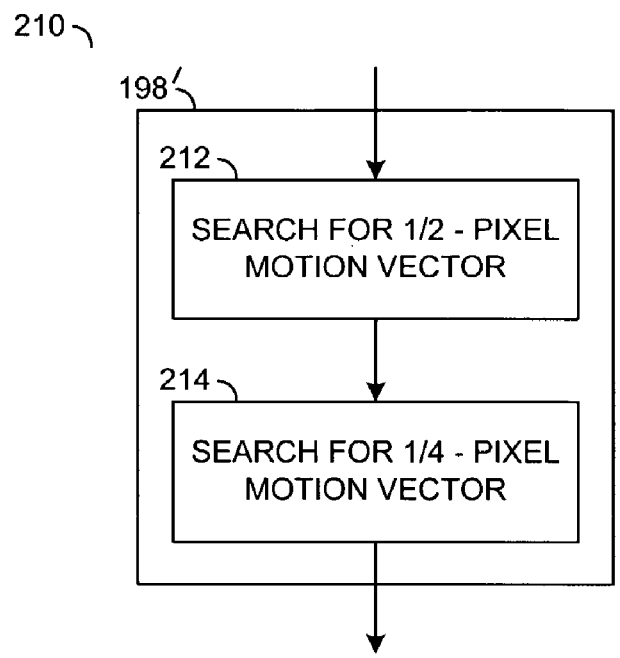
FIG. 8 is a flow diagram of a portion of a fourth method of encoding.

The method shown in FIG. 6 and/or the apparatus shown in FIG. 8 generally differ from conventional methods and apparatus for motion estimation in at least two ways. A first different may be that in the present invention, the region to interpolate may be determined on the range in which the integer-pixel search is performed. Conventional methods either interpolate the entire image, or interpolate a part of the image based on the chosen integer motion vector. A second difference may be that in the present invention, the interpolation is generally performed in parallel with the integer-level search. The first difference may enable the second difference. Disadvantages for conventionally interpolating the entire reference image may exist. A conventional approach to interpolating the reference image on an as-needed basis will interpolate the pixels needed for the sub-pixel search based on the integer-level vector. Therefore, only the pixels needed for a sub-pixel search are generated. For the conventional as-needed approach, however, the integer search must complete before the sub-pixel interpolation begins. Under the present invention, a region based on the search range of the integer search may be interpolated, possibly computing some unnecessary pixels. However, since the interpolation may rely on the range, instead of the integer motion vector itself, the interpolation may be performed in parallel with the integer level search.

Several possible variations on the third method 190 may be implemented. For example, a range of the sub-pixel motion vector search step 198 may be performed over a larger or smaller range than Y=(Vy−3/4, Vy+3/4) and X=(Vx−3/4, Vx+3/4). Therefore, an amount of interpolated pixels computed in step 198 may increased or decreased appropriately.

Referring to FIG. 8, a flow diagram of a portion of a fourth method 210 of encoding is shown. The fourth method 210 may be similar to the third method 190 with the sub-pixel motion vector generation step 198 implementing a two-step approach (e.g., step 198'). In a first step, an intermediate-pixel (e.g., half-pixel) motion vector search may be performed (e.g., step 212). A subsequent sub-pixel (e.g., quarter-pixel) motion vector search may be performed (e.g., step 214). The steps 212 and 214 may be implemented in the sub-pixel search circuit 206.

In another embodiment, several integer-level motion vectors may be generate instead of a single integer-level motion vector. Each of the several integer-level motion vectors may be generated for a different block size among multiple block sizes identified within the reference frame. Computing the integer-level motion vectors may use a method described in co-pending application Ser. No. 10/324,487 which is hereby incorporated by reference in its entirety. The interpolated pixels may be computed once for a largest block size (e.g., 16×16 pixels) and then used for all block sizes (e.g., 16×16, 16×8, 8×16, 8×8, 8×4, 4×8 and 4×4 pixels) Computing the interpolated pixels for a single block size is generally more efficient than computing the interpolated pixels for all block sizes.

The present invention may interpolate a single region based on the integer-level search range and use the interpolated region for a number of block sizes because the integer-level searches for the different block sizes generally have the same search range (as described in the co-pending application). A conventional motion estimator that uses a selected integer-level motion vector to perform interpolation would need to interpolate separately for each block if the different blocks select different integer-level vectors.

Figure 9:
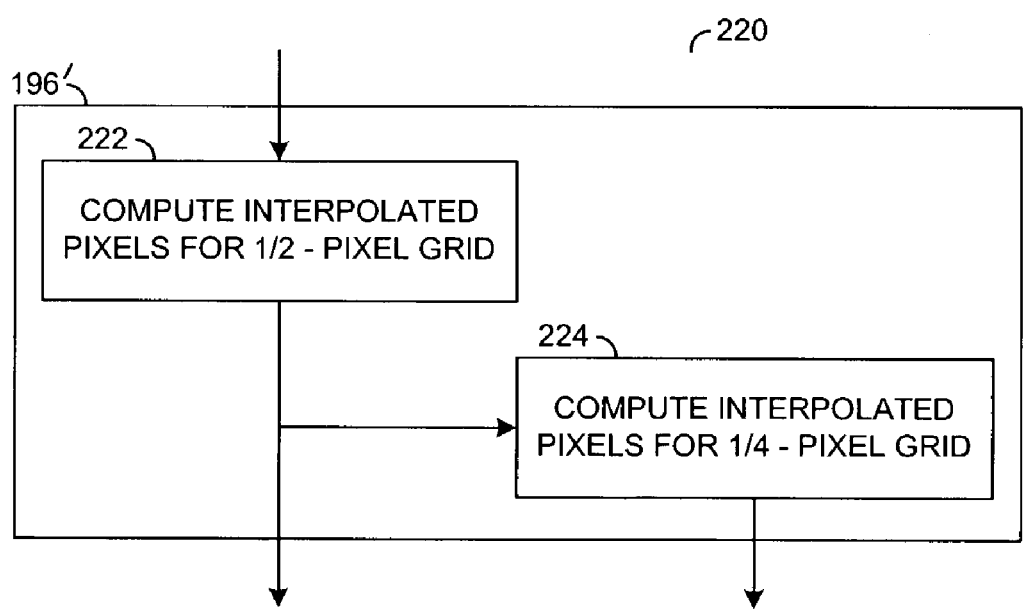
FIG. 9 is a flow diagram of a portion of a fifth method of encoding.

Referring to FIG. 9, a flow diagram of a portion of a fifth method 220 of encoding is shown. The fifth method 220 may be similar to the third method 190 with a variation (e.g., step 196') on the interpolation step 196. Instead of computing all of the pixels potentially used for sub-pixel interpolation in parallel with computing the integer motion vector(s), values for only the pixels on a half-pixel grid are computed (e.g., step 222). Pixels on a quarter-pixel grid in a portion of the region being searched proximate or adjacent to the integer-pixel motion vector may then be interpolated on an as-needed basis while finding the best quarter-pixel motion vector QMV (e.g., step 224). Because the pixels on the quarter-pixel grid for the H.264 standard may be easily and quickly computed from the pixels on the half-pixel grid, the quarter-pixel motion vector search and interpolation to the quarter-pixel grid from the half-pixel grid may be accomplished efficiently at substantially the same time. Furthermore, by interpolating only to the half-pixel grid while finding the integer-level motion vector generally uses less intermediate memory (not shown) for the computations.

The function performed by the flow diagrams of FIGS. 3, 5, 6, 8 and 9 may be implemented using a conventional general purpose digital computer programmed according to the teachings of the present specification, as will be apparent to those skilled in the relevant art(s). Appropriate software coding may readily be prepared by skilled programmers based on the teachings of the present disclosure, as will also be apparent to those skilled in the relevant art (s).

The present invention may also be implemented by the preparation of optimized integrated silicon, ASICs, FPGAs, or by interconnecting an appropriate network of conventional component circuits, as is described herein, modifications of which will be readily apparent to those skilled in the art(s).

The present invention thus may also include a computer product which may be a storage medium including instructions which may be used to program a computer to perform a process in accordance with the present invention. The storage medium may include, but is not limited to, any type of disk including floppy disk, optical disk, CD-ROM, and magneto-optical disks, ROMs, RAMs, EPROMs, EEPROMs, Flash memory, magnetic or optical cards, or any type of media suitable for storing electronic instructions.

As used herein, the term "simultaneously" is meant to describe events that share some common time period but the term is not meant to be limited to events that begin at the same point in time, end at the same point in time, or have the same duration.

While the invention has been particularly shown and described with reference to the preferred embodiments thereof, it will be understood by those skilled in the art that various changes in form and details may be made without departing from the spirit and scope of the invention.

The invention claimed is:

1. A method for motion estimating, comprising the steps of:
   (A) generating a first interpolated block having a sub-pixel resolution in response to a first interpolation process operating on a reference block of a reference frame of a video signal having an integer pixel resolution, wherein each of a plurality of first pixels in said first interpolated block is calculated directly from a plurality of reference pixels in said reference block;
   (B) generating a motion vector having said sub-pixel resolution in response to said first interpolated block and a current block of a current frame of said video signal having said integer pixel resolution; and
   (C) generating a second interpolated block having said sub-pixel resolution in response to a second interpolation process operating on said reference block around said motion vector after said motion vector has been determined at said sub-pixel resolution, wherein (i) said second interpolation process is different than said first interpolation process and (ii) said second interpolation process operates on a greater number of neighboring pixels to generate each of a plurality of second interpolated pixels in said second interpolated block than said first interpolation process operates on to generate each of a plurality of first interpolated pixels in said first interpolated block.

2. The method according to claim 1, wherein said first interpolation process comprises a bi-linear interpolation process.

3. The method according to claim 1, further comprising the step of:
   generating a first difference block in response to subtracting said second interpolation block from said current block.

4. The method according to claim 1, wherein step (B) comprising the sub-steps of:
   generating an intermediate motion vector having an intermediate pixel resolution finer than said integer pixel resolution and coarser than said sub-pixel resolution; and
   generating said motion vector having said sub-pixel resolution in response to said intermediate motion vector.

5. An apparatus comprising:
   a first circuit configured to (i) generate a first interpolated block having a sub-pixel resolution in response to a first interpolation process operating on a reference block of a reference frame of a video signal having an integer pixel resolution and (ii) generate a motion vector at said sub-pixel resolution in response to said first interpolated block and a current block of a current frame of said video signal having said integer pixel resolution, wherein each of a plurality of first pixels in said first interpolated block is calculated directly from a plurality of reference pixels in said reference block; and
   a second circuit configured to generate a second interpolated block having said sub-pixel resolution in response to a second interpolation process operating on said reference block around said motion vector after said motion vector has been determined at said sub-pixel resolution, wherein (i) said second interpolation process is different than said first interpolation process and (ii) said second interpolation process operates on a greater number of neighboring pixels to generate each of a plurality of second interpolated pixels in said second interpolated block than said first interpolation process operates on to generate each of a first plurality of interpolated pixels in said first interpolated block.

6. The apparatus according to claim 5, wherein said first interpolation process comprises a bi-linear interpolation process.

7. The apparatus according to claim 5, further comprising:
   a third circuit configured to generate a first difference block in response to subtracting said second interpolation block from said current block.

8. The apparatus according to claim 5, wherein said first circuit is further configured to:
   generate an intermediate motion vector having an intermediate pixel resolution finer than said integer pixel resolution and coarser than said sub-pixel resolution; and
   generate said motion vector having said sub-pixel resolution in response to said intermediate motion vector.

9. A method for motion estimating, comprising the steps of:
   (A) identifying a first region within a reference frame of a video signal in which to search for a first motion vector for a current block in a current frame of said video signal, wherein said first region both (i) has an integer pixel resolution and (ii) is spatially larger than said current block;

(B) generating a second region having a sub-pixel resolution in response to interpolating said reference frame proximate said first region, wherein (i) said second region is spatially larger than said first region by less than one integer pixel in each direction and (ii) each of a plurality of second pixels in said second region is calculated directly from a plurality of first pixels in said first region;

(C) generating said first motion vector at said integer pixel resolution in response to said first region, wherein said second region and said first motion vector are generated in parallel; and (D) adjusting said first motion vector to said sub-pixel resolution in response to said second region.

10. The method according to claim 9, wherein step (B) and step (C) are performed substantially simultaneously.

11. The method according to claim 9, wherein step (D) comprises the sub-steps of:
adjusting said first motion vector to an intermediate pixel resolution finer than said integer pixel resolution and coarser than said sub-pixel resolution; and
adjusting said first motion vector to said sub-pixel resolution.

12. The method according to claim 9, wherein step (C) comprises the sub-step of:
generating said first motion vector in response to a range signal that defines a search area.

13. The method according to claim 9, wherein step (B) comprises the sub-steps of:
generating said second region having an intermediate pixel resolution finer than said integer pixel resolution and coarser than said sub-pixel resolution; and
generating at least one portion of said second region to said sub-pixel resolution proximate said first motion vector as generated at said integer pixel resolution.

14. An apparatus comprising:
a first circuit configured to identify a first region within a reference frame of a video signal in which to search for a first motion vector for a current block of a current frame of said video signal, wherein said first region both (i) has an integer pixel resolution and (ii) is spatially larger than said current block; and
a second circuit configured to (i) generate a second region having a sub-pixel resolution in response to interpolating said reference frame proximate said first region, (ii) generate said first motion vector at said integer pixel resolution in response to said first region and (iii) adjust said first motion vector to said sub-pixel resolution in response to said second region, wherein (a) said second region is spatially larger than said first region by less than one integer pixel in each direction, (b) said second region and said first motion vector are generated in parallel and (c) each of a plurality of second pixels in said second region is calculated directly from a plurality of first pixels in said first region.

15. The apparatus according to claim 14, wherein generating said second region and generating said first motion vector are performed substantially simultaneously.

16. The apparatus according to claim 14, wherein said second circuit is further configured to:

adjust said first motion vector to an intermediate pixel resolution finer than said integer pixel resolution and coarser than said sub-pixel resolution; and
adjust said first motion vector to said sub-pixel resolution.

17. The apparatus according to claim 14, wherein said second circuit is further configured to:
generate said first motion vector in response to a range signal that defines a search area.

18. The apparatus according to claim 14, wherein the second circuit is further configured to:
generate said second region having an intermediate pixel resolution finer than said integer pixel resolution and coarser than said sub-pixel resolution; and
generate at least one portion of said second region to said sub-pixel resolution proximate said first motion vector as generated at said integer pixel resolution.

19. A method for motion estimating, comprising the steps of:
(A) identifying a first region within a reference frame of a video signal in which to search for a plurality of motion vectors for a plurality of different block sizes in a current frame of said video signal, wherein said first region has an integer pixel resolution;

(B) generating a second region having a sub-pixel resolution in response to interpolating said reference frame proximate said first region, wherein (a) said second region is both (i) computed using a largest of said different block sizes and (ii) spatially larger than said first region and (b) each of a plurality of second pixels in said second region is calculated directly from a plurality of first pixels in said first region;

(C) generating said motion vectors at said integer pixel resolution in response to said first region, wherein said second region and said motion vectors are generated in parallel; and (D) adjusting said motion vectors to said sub-pixel resolution in response to said second region, wherein at least two of said motion vectors describe motion for a plurality of current blocks having said different block sizes.

20. The method according to claim 19, wherein step (B) and step (C) are performed substantially simultaneously.

21. An apparatus comprising:
a first circuit configured to identify a first region within a reference frame of a video signal in which to search for a first motion vector for a current block of a current frame of said video signal, wherein said first region has an integer pixel resolution; and
a second circuit configured to generate (i) a second region both spatially larger than said first region and having a sub-pixel resolution in response to interpolating said reference frame proximate said first region, (ii) a plurality of second motion vectors at said integer pixel resolution in response to said first region and (iii) said first motion vector at said sub-pixel resolution in response to said second region and said second motion vectors, wherein each of a plurality of second pixels in said second region is calculated directly from a plurality of first pixels in said first region, and wherein at least two of said second motion vectors describe motion for a plurality of blocks having different sizes.

22. The apparatus according to claim 21, wherein generating said second region and generating said second motion vectors are performed substantially simultaneously.

* * * * *